United States Patent [19]

Kuhlenschmidt et al.

[11] Patent Number: 5,729,999
[45] Date of Patent: Mar. 24, 1998

[54] HELICAL ABSORBER CONSTRUCTION

[75] Inventors: Donald Kuhlenschmidt, Evansville, Ind.; Michael W. Klintworth, Covington, Ohio

[73] Assignee: Gas Research Institute, Chicago, Ill.

[21] Appl. No.: 532,241

[22] Filed: Sep. 22, 1995

[51] Int. Cl.[6] .................. B25B 15/12; B28D 7/12; F28F 13/12
[52] U.S. Cl. .................. 62/484; 62/485; 165/156; 165/109.1
[58] Field of Search .................. 62/476, 484, 485, 62/494, 497, 101; 165/154, 156, 109.1, 170

[56] References Cited

U.S. PATENT DOCUMENTS

| | | | |
|---|---|---|---|
| 936,060 | 2/1909 | Viedt | 165/156 |
| 1,455,164 | 5/1923 | Coen | 165/156 |
| 1,815,938 | 7/1931 | Trogner | 165/156 |
| 2,781,644 | 2/1957 | Saposnikov et al. | 62/119 |
| 3,452,551 | 7/1969 | Aronson | 62/148 |
| 3,730,229 | 5/1973 | D'Onofrio | 138/114 |
| 3,990,263 | 11/1976 | Ainbinder et al. | 62/476 |
| 4,338,268 | 7/1982 | Wilkinson et al. | 261/140 A |
| 4,467,623 | 8/1984 | Reimann | 62/494 |
| 4,477,396 | 10/1984 | Wilkinson | 261/140 R |
| 4,524,587 | 6/1985 | Kantor | 62/101 |
| 4,570,456 | 2/1986 | Reimann et al. | 62/476 |
| 4,722,194 | 2/1988 | Kantor | 62/101 |
| 4,881,376 | 11/1989 | Yonezawa et al. | 62/106 |
| 5,263,340 | 11/1993 | Sekoguchi et al. | 62/497 |
| 5,339,654 | 8/1994 | Cook et al. | 62/476 |
| 5,421,173 | 6/1995 | Lee et al. | 62/485 |

FOREIGN PATENT DOCUMENTS

| | | | |
|---|---|---|---|
| 5704 | 7/1902 | Denmark | 62/485 |
| 64496 | 4/1983 | Japan | 165/156 |
| 259387 | 10/1988 | Japan | 165/156 |
| 779719 | 11/1980 | U.S.S.R. | 165/156 |
| 355205 | 2/1930 | United Kingdom | 165/156 |

*Primary Examiner*—William Doerrler
*Attorney, Agent, or Firm*—McAndrews, Held & Malloy, Ltd.

[57] ABSTRACT

A fluid heat exchange apparatus is disclosed that can be used as an absorber in an absorption cooling system. The compact absorber design uses concentric thermally conductive cylinders to form alternating annular passages for a heat transfer fluid and a solution. The heat transfer fluid passages contain a generally helical coil. The generally helical coil distributes the heat transfer fluid in a generally helical path between the thermally conductive cylinders. The solution passages also contain a generally helical coil. However, the solution passage coils are grooved rods. The grooved rods allow solution to flow between the rods and the walls of the cylinders. The solution flows down the cool walls of the thermally conductive cylinders. Simultaneously, refrigerant vapor flows upward in a generally helical path within the solution passages and is absorbed into the solution droplets. Further, additional embodiments are disclosed that use a grooved rod to absorb a vapor into a solution.

8 Claims, 4 Drawing Sheets

HELICAL ABSORBER CONSTRUCTION

The present invention relates to a fluid heat exchange apparatus, in particular an absorber design for use in an absorption cooling system.

BACKGROUND OF THE INVENTION

Absorption cooling systems are well known. In an absorption cooling system, a generator heats a refrigerant solution comprising a "strong" or concentrated solution of a more-volatile or refrigerant component in a less-volatile or solvent component. The heat drives the refrigerant from the strong solution to separate a refrigerant vapor, leaving a "weak solution" that is depleted of the refrigerant.

Where the refrigerant solution is a solution of a non-volatile solute in a volatile solvent, such as lithium bromide in water, the "weak solution" contains a higher concentration of the solute but a lower concentration of the solvent than the corresponding "strong solution." Where the refrigerant solution is a solution of a more-volatile solute in a less-volatile solvent, such as ammonia in water, the "weak solution" is depleted of ammonia and is mostly water, while the "strong solution" is a more concentrated ammonia solution.

After being separated in the generator, the refrigerant vapor leaves the generator, flowing to a condenser. In the condenser the refrigerant vapor is placed under pressure and heat is removed to an external heat sink. As a result, the vapor condenses to form a refrigerant liquid. After leaving the condenser, the refrigerant liquid flows to an evaporator. The evaporator relieves the pressure on the refrigerant liquid and the refrigerant evaporates, again forming a vapor. This evaporation of the refrigerant draws heat from a heat load and creates the cooling effect of a refrigerator or air conditioner.

The refrigerant vapor from the evaporator flows to the absorber. The weak solution remaining in the generator also flows to the absorber. In the absorber, the weak solution reabsorbs the refrigerant, reforming the strong solution.

Typically, the absorber is arranged so that the weak solution enters the top of the enclosed absorber and flows downward. The refrigerant vapor enters the bottom of the absorber and flows upward. In counterflow with the refrigerant vapor, the weak solution absorbs the refrigerant and becomes a strong solution. The strong solution then flows back to the generator and the cycle repeats.

Having been heated to drive off refrigerant vapor in the generator, the weak solution is very hot. Also, the absorption process further heats the solution as it becomes stronger. More refrigerant can be absorbed in the refrigerant solution if the solution is cooled. To facilitate reabsorption of the refrigerant into the weak/strong solution, the solution must therefore be cooled. ("Weak/strong solution" is used herein to denote the originally weak solution that is introduced into the absorber and progressively becomes stronger as it passes through the absorber, finally becoming a strong solution by the time it leaves the absorber. This term refers to the liquid component of the refrigerant anywhere between the entrance and exit of the absorber.)

A liquid coolant circulates through the absorber and draws heat from the weak/strong solution and the refrigerant vapor. After circulating through the absorber, the liquid coolant exits the absorber and is either disposed or cooled at an external heat sink and recycled.

The liquid coolant circulates through the absorber in a thermally conductive conduit. The conduit prevents intermixing of the liquid coolant and weak/strong refrigerant solution. The solution, however, transfers heat through the walls of the conduit and into the liquid coolant. For good efficiency, an absorber must promote heat transfer by providing intimate contact between the weak solution and the cool surface of the liquid coolant conduit. Also, for maximum efficiency, the liquid coolant exiting the absorber should be nearly as hot as the entering weak refrigerant solution. The efficient absorber wastes little of the cooling potential in the liquid coolant.

In the prior art, absorbers circulate the liquid coolant in metal pipe or tubing. Metal pipe provides a simple method for circulating a liquid coolant in an absorber. The weak/strong solution flows or is sprayed over the cool surface of the pipe or, alternatively, the coolant pipe is submerged in a pool of weak/strong solution. This prior absorber design increases heat transfer by increasing the length of coolant pipe in the absorber.

Coolant pipe, however, has several disadvantages. First, metal pipe is expensive and a large amount is needed in an absorber. Also, metal pipe must be formed into complex and intricate convoluted shapes that are difficult and expensive to manufacture. Second, pipe inefficiently transfers heat from the weak/strong solution to the enclosed liquid coolant. For efficient heat transfer, the metal pipe can be completely submerged in a pool of solution. Then, however, only the surface of the solution contacts the refrigerant vapor. The coolest portion of the solution under the surface does not contact the refrigerant vapor.

Ideally, the weak/strong solution simultaneously contacts both the liquid coolant conduit and the refrigerant vapor. While the weak/strong solution is cooled, the weak/strong solution may simultaneously absorb refrigerant. Older absorber designs recognize the benefit of simultaneous contact. In these designs, the weak/strong solution meanders over coolant baffles within a vapor space or flows through a series of pools. Alternatively, the solution is sprayed or dripped through a vapor space onto coolant pipe. These designs, however, require a large amount of space.

Reduced size has become the greatest challenge in absorber construction. If absorber size can be reduced, absorption cooling systems will find more widespread application.

Finally, in the prior art, absorber designs have not been easy to modify. Manufacturers seek to modify the performance characteristics of an absorber design to adapt a given absorber to multiple applications or to optimize the performance of a given absorber. An absorber performs optimally when the weak/strong solution becomes fully saturated with refrigerant, all refrigerant vapor entering the absorber is absorbed, and the absorber wastes none of the cooling potential in the liquid coolant. To adapt or optimize the performance of a given absorber, prior art designs forced a manufacturer to modify the external inputs to the absorber. For example, the manufacturer could modify the rate of flow of the weak/strong solution, refrigerant vapor, or liquid coolant into the absorber. The manufacturer could not easily modify a given absorber design to optimize its performance.

Accordingly, those skilled in the art of absorber design have sought an absorber that fully saturates a solution, uses a liquid coolant efficiently, is inexpensive to manufacture, is compact in size and is easily modified to adapt a given absorber to multiple applications or to optimize a given absorber.

Therefore, an object of the present invention is to provide an absorber design that maximizes heat transfer between a solution and a liquid coolant.

Also, an object of the present invention is to provide an absorber design that maximizes contact between a weak/strong solution and a refrigerant vapor so that the solution becomes fully saturated with refrigerant vapor.

A further object of the present invention is to provide an absorber design that maximizes the cooling potential of a liquid coolant passing through the absorber.

Another object of the present invention is to provide an absorber design that does not use metal pipe to carry liquid coolant through the absorber.

An additional object of the present invention is to provide an absorber design that uses a common housing and common parts to build similarly sized and similarly constructed absorbers with different performance characteristics.

A still further object of the present invention is to provide an absorber design that is small and compact in size.

Finally, an object of the present invention is to provide an absorber design that is simple and economical to manufacture.

SUMMARY OF THE INVENTION

One aspect of the invention is an apparatus that can be used for transferring heat from a fluid, dissolving a vapor into the fluid, or both. The apparatus includes first and second substantially parallel walls defining a space between them. At least one rod is located in this space and is adjacent to both walls. The rod subdivides the space between the walls, defining a tortuous fluid path in the space. In a related aspect of the invention, a ridge replaces the rod and defines a tortuous fluid path in the space between the two walls.

The apparatus can include a third wall that is substantially parallel to the second wall, defining a second space between them. The second wall is thermally conductive to allow heat transfer from the first space to the second space or vice versa.

In one embodiment, the first, second and third walls are substantially concentric cylinders and the axis of the cylinders is normally substantially vertical. ("Substantially vertical" as used here means sufficiently vertical that the device can operate, at least to some degree, so that fluid can either flow directly in the direction regarded as substantially vertical or flow obliquely in a different direction that has a component in the direction regarded as substantially vertical. "Normally substantially vertical" as used here means that, at least when the device is mounted and in use or ready to be used, it is substantially vertical.)

A second rod can be located between and adjacent to the second and third walls, subdividing the second space to form a tortuous fluid path.

The first and second rods can be generally helical coils that define generally helical passages bounded by successive runs of the rods in their respective spaces. (As used here, a "generally helical" coil is a rod wound to form a shape at least resembling a cylinder, and a generally helical space is the space formed between the runs of a generally helical coil.)

In at least one space, the generally helical coil rod can have a circumferentially grooved substantially vertical surface with substantially vertical grooves that allows a thin film of solution to flow substantially vertically downward between the rod and an adjacent cylinder wall. Also in that space, the generally helical coil can direct a vapor to be dissolved in the weak/strong solution upward through the generally helical passage. In the other space, the generally helical coil directs a heat transfer fluid through the generally helical passage in heat transfer communication with the solution.

The present invention has several advantages- First, the concentric cylinders and generally helical coils increase the distance of fluid flow in a compact space. Second, the cylindrical walls provide improved heat transfer over conventional designs. Third, the circumferentially grooved rod provides improved cooling of the solution by directing a thin film of the solution along the thermally conductive walls of the cylinder. Fourth, the circumferentially grooved rod provides improved absorption by increasing the contact of solution with a vapor space. Fifth, compared to conventional designs, the invention is inexpensive to manufacture. Sixth, the concentric cylinders and generally helical coils allow a manufacturer to build similarly sized and similarly constructed absorbers with different performance characteristics.

These and other advantages, one or more of which is provided at least to a degree by the present invention, will become apparent as this specification is read in conjunction with the accompanying drawings and appended claims.

Figure 1:
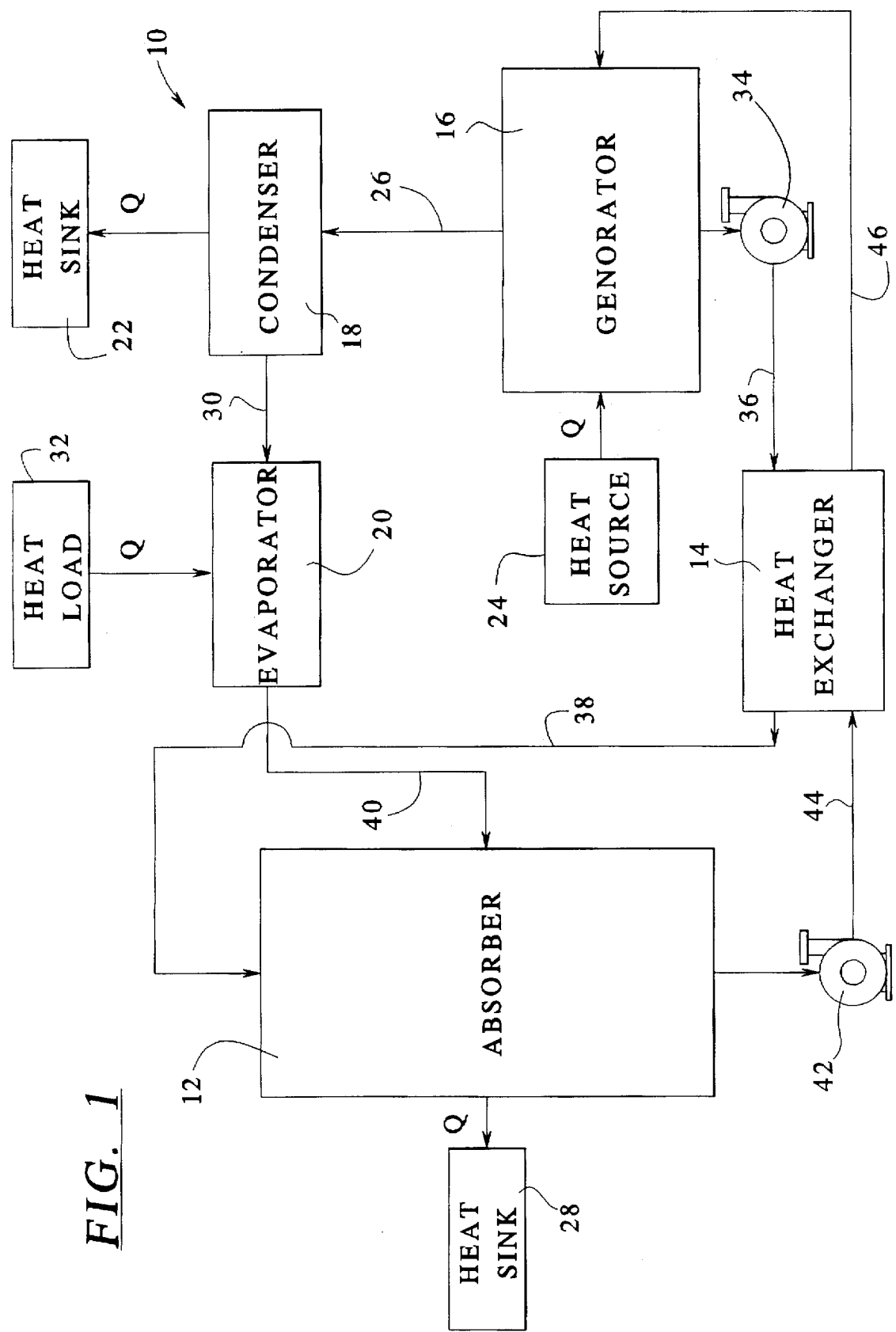
FIG. 1 is a schematic flow diagram of a typical absorption cooling system including an absorber built according to the invention.

In the Figures, the following reference characters are used:

10 absorption cooling system
12 absorber
14 heat exchanger
16 generator
18 condenser
20 evaporator
22 condenser heat sink
24 heat source
26 conduit: generator to condenser
28 absorber heat sink
30 conduit: condenser to evaporator
32 heat load
31 first expansion valve
36 conduit: generator to heat exchanger
38 conduit: heat exchanger to absorber
39 second expansion valve
40 conduit: evaporator to absorber
42 strong solution pump
44 conduit: absorber to heat exchanger
46 conduit: heat exchanger to generator
50 strong solution outlet
51 vapor inlet
52 solution distribution pan
53 coolant inlet
54 coolant outlet
55 weak solution inlet
56 outer housing
58 bottom plate assembly 60 top plate assembly
61 first helical coil rod
62 second helical coil rod (threaded)
63 third helical coil rod
64 fourth helical coil rod (threaded)
65 fifth helical coil rod
66 sixth helical coil rod (threaded)
67 bottom seal, first annular space
68 bottom seal, third annual space
69 bottom seal, fifth annular space
71 first cylinder wall
72 second cylinder wall
73 third cylinder wall
74 fourth cylinder wall
75 fifth cylinder wall
76 sixth cylinder wall
77 top seal, first annual space
78 top seal, third annular space
79 top seal, fifth annular space
82 weak solution pool
84 strong solution pool
92 distribution outlets
100 vertical axis
101 first annular space (coolant)
102 second annular space
103 third annular space (coolant)
104 fourth annular space
105 fifth annular space (coolant)
106 sixth annular space
110 ridges
112 grooves

DETAILED DESCRIPTION OF THE INVENTION

Although the invention is described in connection with one or more preferred embodiments, the invention is not limited to those embodiments. The invention includes alternatives, modifications and equivalents that are included in the spirit and scope of the appended claims.

As seen in FIG. 1, the preferred embodiment of the present invention operates in an absorption cooling system 10. The absorption cooling system 10 includes a generator 16, a condenser 18, an evaporator 20, an absorber 12, and heat exchanger 14.

When it enters the generator, the strong refrigerant solution has at least substantially the maximum concentration of dissolved refrigerant vapor. Heat transferred from a heat source 24 (heat transfers are schematically represented in FIG. 1 by the letter Q and an arrow indicating the direction of heat transfer) heats the refrigerant solution in the generator 16, distilling the refrigerant from the solution to form a free refrigerant vapor and deplete the remaining liquid of refrigerant. The remaining liquid is now the "weak solution". The refrigerant vapor leaves the generator via the conduit 26 and flows to a condenser 18.

In the condenser 18 the refrigerant vapor is maintained under pressure, while removing heat of condensation, Q. As a result, the refrigerant vapor condenses to become a liquid. The heat of condensation, Q, is transferred to the condenser heat sink 22. The condenser heat sink 22 can be anything capable of absorbing heat.

The liquid refrigerant then flows to the evaporator 20 via the conduit 30. As the liquid refrigerant flows to the evaporator 20, the first expansion valve 31 relieves the pressure on the refrigerant. The refrigerant evaporates in the evaporator 20, absorbing heat Q from the heat load 32 to produce the cooling effect of the present system.

After the generator 16 drives the refrigerant from the strong solution, the weak solution remains. The weak solution is hot, having been heated to evaporate and separate the refrigerant vapor. The weak solution flows to the heat exchanger 14 via a conduit 36. In the heat exchanger 14, the weak solution transfers heat to the relatively cool, strong solution flowing to the generator 16.

The weak solution then flows to the absorber 12 via the conduit 38. A second expansion valve 39 regulates the flow of the weak solution to the absorber 12. The refrigerant vapor also flows to the absorber from the evaporator 20 via the conduit 40. In the absorber, the refrigerant vapor is reabsorbed into the weak/strong solution, reforming the strong solution.

After reabsorption, the resulting strong solution is pumped by the strong solution pump 42 to the heat exchanger 14 via the conduit 44. As previously described, the strong solution flows in heat exchange with the hotter, weak solution in the heat exchanger 14. The strong solution then flows back to the generator via the conduit 46. The process then periodically repeats for as long as the apparatus is in operation.

The absorption process generates heat that must be removed to the heat sink 28 to facilitate reabsorption of the refrigerant into the weak/strong solution in the absorber 12. To transfer this heat, a heat transfer fluid, such as a liquid coolant, is circulated through the absorber 12. In the absorber 12, the liquid coolant draws heat from the weak/ strong solution. After circulating through the absorber, the liquid coolant exits the absorber and is either disposed or recycled through the system after cooling.

Figure 2:
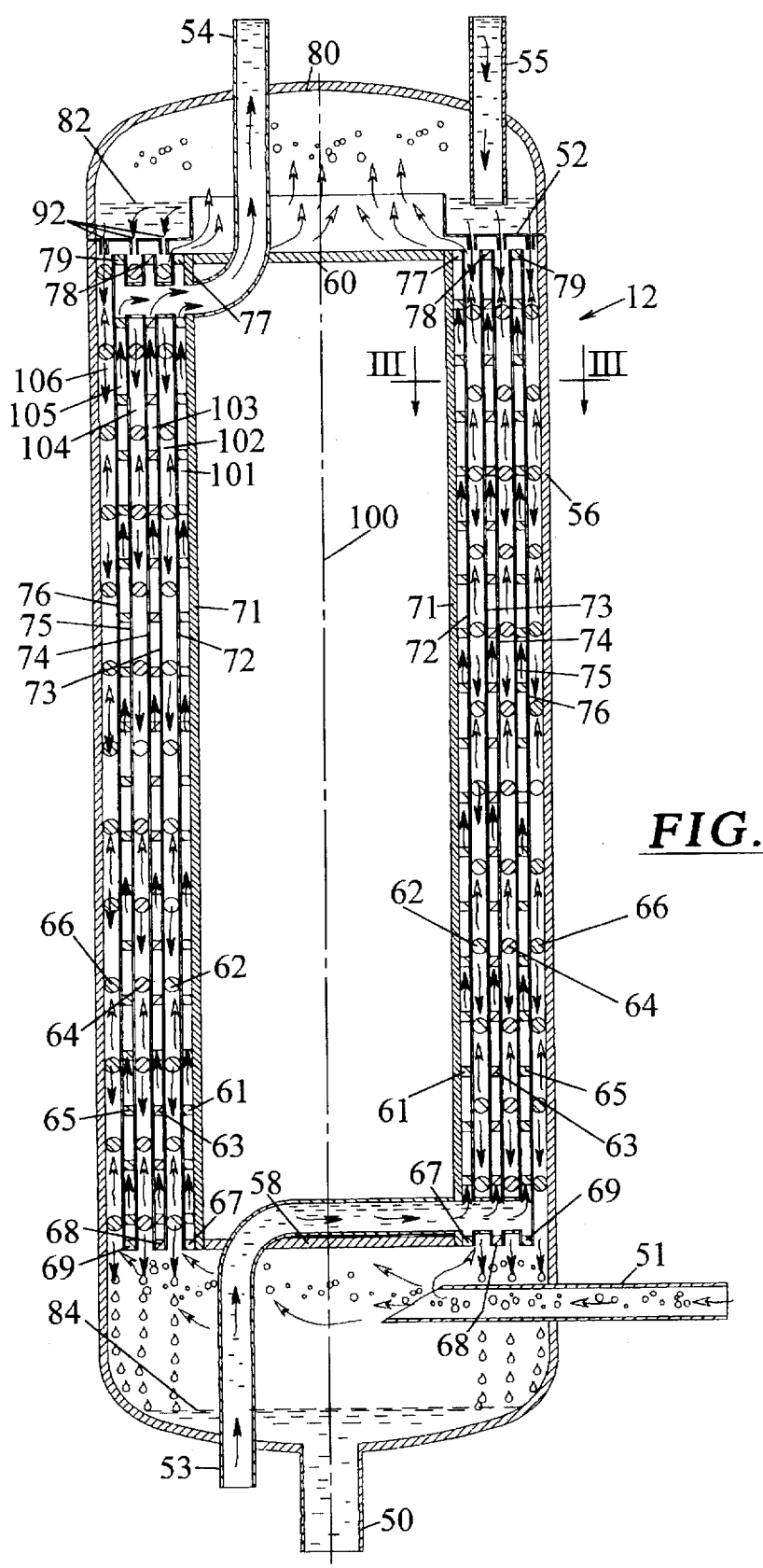
FIG. 2 is a longitudinal section of one embodiment of an absorber according to the present invention.
Figure 3:
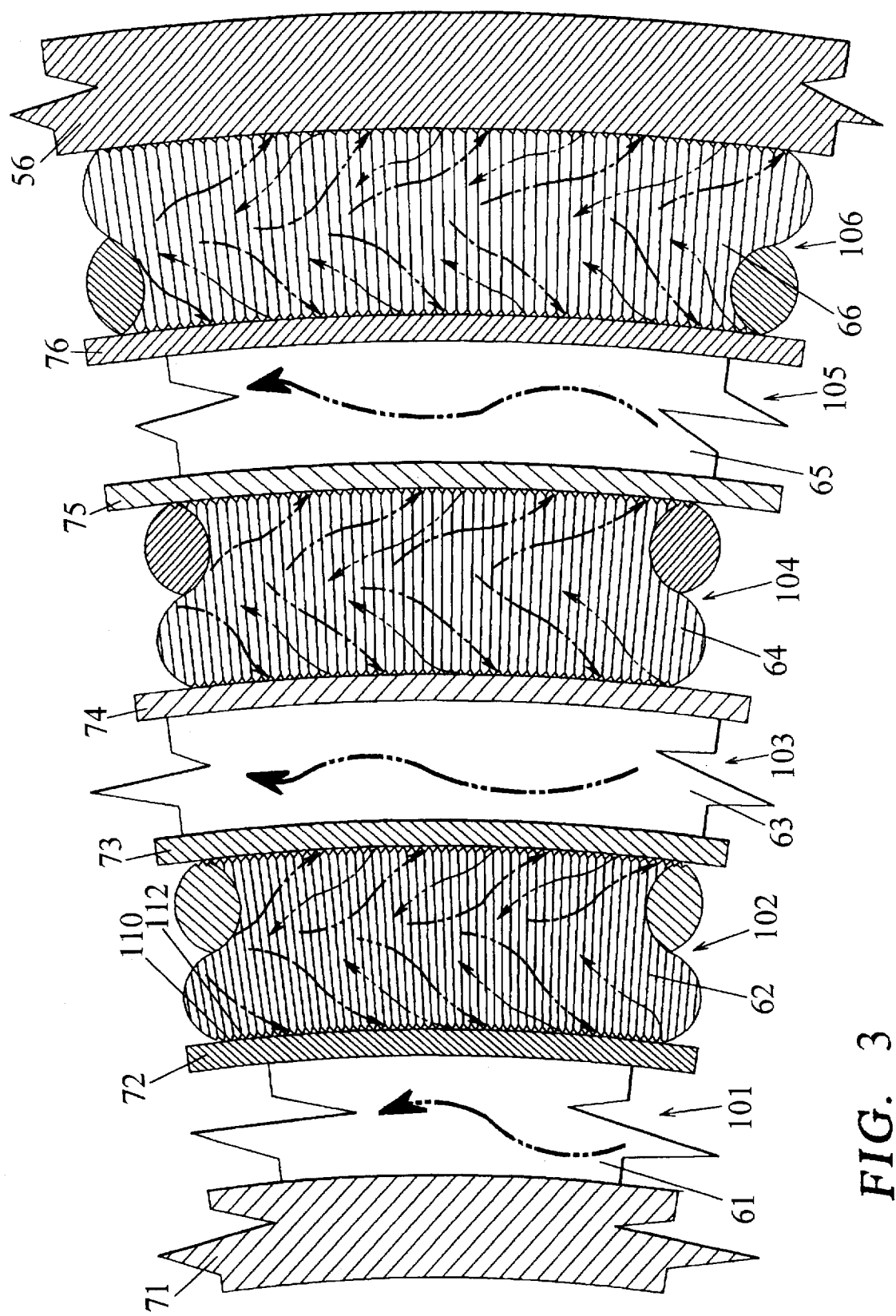
FIG. 3 is a fragmentary section taken along line 3—3 of FIG. 2.
Figure 4:
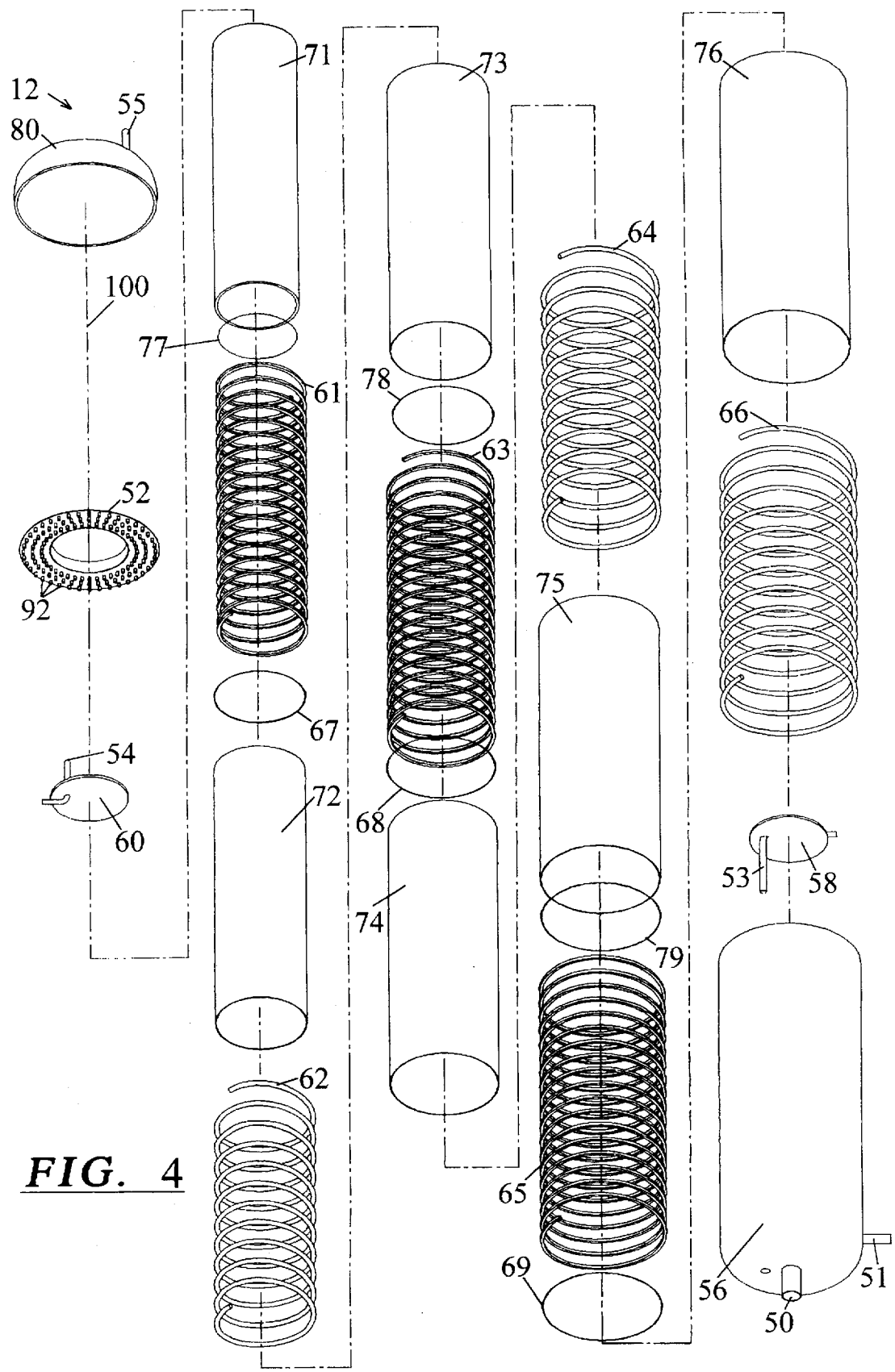
FIG. 4 is an exploded perspective view of the absorber of FIG. 2, showing details of its construction.

In FIGS. 2–4, the absorber 12 according to the present invention (FIGS. 2–3) and its components (FIG. 4) are illustrated in more detail. The absorber 12 is oriented about a normally substantially vertical axis 100. The absorber includes an outer housing 56, a bottom plate assembly 58, six concentric cylinder walls 71–76, six generally helical coil rods 61–66 located between the walls, top seals 77–79, bottom seals 67–69, a top plate assembly 60, a solution distribution pan 52, and an outer housing cover 80. More or less than six coil rods 61–66, and a corresponding greater or smaller number of walls 71–76 and other multiple elements, may be provided without departing from the scope of the invention.

The outer housing includes a strong solution outlet 50 and a vapor inlet 51. The bottom plate assembly includes a coolant inlet 53 that extends through the outer housing 56. The top plate assembly includes a coolant outlet 54 that extends through the outer housing cover 80. The outer housing cover 80 includes a weak solution inlet 55. The solution distribution pan 52 includes multiple distribution outlets 92.

On the absorber 12, the strong solution outlet is connected to the conduit 44 that transfers strong solution from the absorber 12 to the heat exchanger 14. The vapor inlet 51 is connected to the conduit 40 that transfers vapor from the evaporator 20 to the absorber 12. The weak solution inlet 55 is connected to the conduit 38 that transfers weak solution from the heat exchanger 14 to the absorber 12. The coolant inlet 53 and coolant outlet 54 circulate liquid coolant and allow heat transfer to the absorber heat sink 28.

As shown in FIGS. 2 and 3, the six cylinder walls 71–76 and the cylindrical outer housing 56 are substantially concentric about the substantially vertical axis 100. The seven cylinders thus have substantially parallel substantially vertical walls that define six adjacent annular spaces 101–106 between the cylinders. The first annular space 101, for example, is bounded by the first cylinder wall 71 and the second cylinder wall 72. The second annular space 102 is bounded by the second cylinder wall 72 and the third cylinder wall 73, etc.

The generally helical coil rods 61–66 are located in the six annular spaces 101–106. The first generally helical coil rod 61, for example, is located in the first annular space 101. Similarly, the second through the sixth generally helical coil rods 62–66 are located, respectively, in the second through the sixth annular spaces 102–106.

The first annular space 101, third annular space 103, and fifth annular space 105 are sealed at the top and bottom. More specifically, the first annular space 101 is sealed at the top by the top seal 77 and at the bottom by the bottom seal 67. Similarly, the third annular space 103 is sealed by the top seal 78 and the bottom seal 68. Finally, the fifth annular space 105 is sealed by the top seal 79 and the bottom seal 69.

In this embodiment, the coolant enters via the coolant inlet 53, and is distributed to the first annular space 101, third annular space 103, and the fifth annular space 105 (the three liquid coolant passages) under pressure. The first annular space 101, the third annular space 103, and the fifth annular space 105 carry the liquid coolant from the coolant inlet 53 to the coolant outlet 54. The flow of the liquid coolant in the liquid coolant passages is represented in FIG. 2 by the upward pointing solid-headed arrows.

The second annular space 102, the fourth annular space 104, and the sixth annular space 106 carry the weak/strong solution downward, as represented in FIG. 2 by the downward pointing solid-headed arrows, and the refrigerant vapor upward, as represented by the upward pointing outline-headed arrows. The weak solution enters the absorber 12 at the weak solution inlet 55. The weak solution collects as a pool 82 in the solution distribution pan 52. The weak solution drips through distribution outlets 92 into the second annular space 102, fourth annular space 104, and the sixth annular space 106 (the three solution passages). The weak/strong solution flows downward under the force of gravity through the three solution passages.

The refrigerant vapor enters the absorber 12 at the vapor inlet 51. The refrigerant vapor flows upward into the three solution passages 102, 104, and 106. Within the passages, the refrigerant vapor flows upward in counter-flow with the downward flowing weak/strong solution. The counter-flow enables the weak/strong solution to become fully saturated with refrigerant.

The now strong solution flows downward out of the three solution passages 102, 104, and 106 and collects in a pool 84 at the bottom of the absorber 12. The strong solution exits the absorber at the strong solution outlet 50 and flows to the heat exchanger 14 and then the generator 16.

The cylinder walls 71–76 are thermally conductive and allow heat transfer to the liquid coolant from the weak/strong solution and the refrigerant vapor. The weak/strong solution and refrigerant vapor in the second annular space 102, for example, transfer heat through the second cylinder wall 72 and the third cylinder wall 73 to the liquid coolant circulating in the first annular space 101 and the third annular space 103, respectively. The liquid coolant facilitates the reabsorption of the refrigerant vapor into the weak/strong solution by cooling the weak/strong solution and refrigerant vapor as heat is generated in the course of absorption.

In this embodiment, the weak/strong solution and the liquid coolant flow in alternating and adjacent annular spaces to provide a large heat transfer area, so the liquid coolant cools the weak/strong solution. However, additional features can be provided to further enhance heat exchange.

As described above, the six annular spaces 101–106 respectively contain the generally helical coil rods 61–66. Each generally helical coil rod such as 61 breaks one of the annular spaces such as 101 into a generally helical path defined by the space between the runs of the coil rod 61. Thus, a generally helical coil rod creates a tortuous path within each annular space. In the three liquid coolant passages 101, 103, and 105 the helical coil rods 61, 63, and 65 can be square-section rods, although rods having round or other cross-sections may be used. As shown in FIG. 3, the square rods 61, 63, and 65 substantially continuously abut the adjacent cylinder walls. In the first annular space 101, for example, the square rod 61 abuts the first cylinder wall 71 and the second cylinder wall 72. The rods and walls can fit tightly, or additional sealing material or welds can be provided to secure the rods to the walls. Any expedient can be used that will prevent or limit the substantially vertical flow of fluid between the runs of the square rod such as 61 and the cylinder walls such as 71 and 72. Similarly, in the third annular space 103 and the fifth annular space 105, the square rods 63 and 65 each abut the thermally conductive cylinder walls that embrace them.

In the three liquid coolant passages 101, 103, and 105, the square rods 61, 63, and 65 extend in an open-wound helix (meaning that the rods are wound so each run is axially separated from the preceding and following runs) extending from the bottom of the liquid coolant passages to the top of the passages. Because the square rods continuously abut adjacent cylinder walls, an enclosed or substantially enclosed generally helical path is formed from the bottom to the top of each liquid coolant passage. The enclosed generally helical path allows liquid coolant to be pumped in a generally helical path-through each liquid coolant passage.

The long, generally helical path followed by the liquid coolant increases the time the liquid coolant spends in the absorber 12. The liquid coolant reaches or comes closer to the temperature of the weak/strong solution when it resides longer in the absorber. Accordingly, substantially the full cooling potential of the liquid coolant may be realized.

Also, the generally helical path is created inexpensively, using a relatively inexpensive assembly of thermally conductive cylinders and generally helical coil rods. Further, providing the generally helical path is filled or substantially filled with the coolant, the generally helical path of the liquid coolant cools substantially the entire cylinder on each side of the liquid coolant passage. The thermally conductive cylinder walls have large surface areas and substantially the entire surface area is used to transmit heat from the weak/strong solution to the liquid coolant.

In the three solution passages 102, 104, and 106, the generally helical coil rods 62, 64, and 66 are round, circumferentially grooved or generally helically threaded rods. Rods having other cross-sections can also be used. As shown in FIG. 3, the grooved rods such as 62 have substantially vertical ridges such as 110 and grooves such as 112 along their lengths defining a grooved surface. In the second annular space 102, the ridges of the grooved rod 62 abut the second cylinder wall 72 and the third cylinder wall 73. In the fourth annular space 104, the ridges of the grooved rod 64 abut the fourth cylinder wall 74 and the fifth cylinder wall 75. In the sixth annular space 106, the ridges of the grooved rod 66 abut the sixth cylinder wall 76 and the cylindrical outer housing 56.

In the three weak/strong solution passages 102, 104, and 106, the grooved rods 62, 64, and 66 each extend in a helix from the top of the corresponding solution passage to the bottom of the passage and break the solution passage into a generally helical tortuous path.

The weak solution drips from the solution distribution pan 52 through the distribution outlets 92 into the tops of the three solution passages. In each solution passage such as 102, the weak solution drips onto the grooved rod 62 and flows circumferentially about the rod 62 through the grooves 112. The weak solution forms a falling film along the cylinder walls on either side of each grooved rod. The grooved rod meters the flow of the solution and controls the thickness of the falling film below it. At the next level, the solution again meets a grooved rod and the process repeats. Thus, a substantially vertically falling film is formed on substantially the entire surface of the opposed cylinder walls.

Meanwhile, in the same solution passages, refrigerant vapor circulates upward at least predominantly along the generally helical path. Thus, refrigerant vapor fills the generally helical path and is absorbed by the weak/strong solution flowing down the cylinder walls. As the weak/strong solution falls along the cylinder walls, the weak/strong solution is simultaneously in intimate contact with the cooled cylinder walls and with the refrigerant vapor in the generally helical path. Accordingly, the weak/strong solution dissipates heat through the cylinder to the coolant and simultaneously absorbs refrigerant vapor.

Alternatively, the ridges 110 and the valleys 112 of the grooved rods may be small enough that the weak/strong solution both flows down the generally helical path and drips between the grooved rod and the cylinder walls. Under this alternative, the weak/strong solution and the refrigerant vapor are in parallel counterflow in the generally helical path, as well as counterflowing in the manner previously described. In this embodiment, the ridges of the grooved rod create turbulence in the flow of the weak/strong solution. This turbulence causes refrigerant-rich solution at the top of the flow to blend locally with refrigerant-poor solution at the bottom of the flow. The ridges thereby further promote the solution becoming fully saturated with refrigerant. As a further alternative, a rod essentially stopping vertical flow between itself and the cylinder wall may replace the grooved rod in the solution passages so that the weak/strong solution and refrigerant vapor are in simple counterflow in the generally helical path.

Several alternative embodiments are also within the scope of the present invention. For example, the tortuous fluid path of the present invention need not be formed by a rod placed between two walls. The same tortuous path may be formed by integrating the rod and one of the parallel walls.

In addition, the walls of the present invention need not be circular cylinders. By definition, a cylinder is any surface or solid bounded by two parallel planes and generated by a line tracing a closed curve perpendicular to the given planes. Accordingly, the cross-section of the cylinder walls of the present invention may be any closed curve including a rectangle, square, triangle, oval, etc.

Moreover, the walls need not be cylinders but may be flat, parallel, planar surfaces. A rod or a series of staggered, generally horizontally disposed rods may be placed between two flat walls and thereby create a tortuous fluid path between the walls. This embodiment is within the teachings of the present invention. The rod need not be a generally helical coil to realize some of the advantages of the present invention.

Also, the rod may take the form of one or more hoops, or may be broken into multiple rods between parallel walls. In addition, the grooves on the rod may be transferred from the rod to the surface of the wall. A non-grooved rod placed against a substantially vertically grooved or corrugated wall would realize at least some of the advantages of the present invention.

The concentric cylinders of the illustrated embodiment facilitate a compact design that is relatively inexpensive to manufacture. The generally helical coils maximize the distance of fluid flow in a cylindrical space. Also, the generally helical coils are readily available and easily manufactured using modern spring-making technology. Further, the generally helical coils allow a manufacturer to modify the performance characteristics of the absorber.

An absorber performs optimally when the weak/strong solution becomes fully saturated with refrigerant, all vapor entering the absorber is absorbed, and the absorber wastes no potential cooling in the liquid coolant. The generally helical coils illustrated in the present Figures allow a user to modify the performance characteristics of the absorber. By using longer, tighter coils in the liquid coolant passages a manufacturer may increase the distance traveled by the liquid coolant and, correspondingly, increase the heat transfer to the liquid coolant. Alternatively, a manufacturer may use longer, tighter coils in the solution passages and increase the time the weak/strong solution spends in contact with refrigerant vapor.

A manufacturer may use a common housing and identical cylinders to manufacture absorbers with different performance characteristics. The absorbers are distinguished by the tightness of the generally helical coils placed in the absorber. Thus, a manufacturer may offer a standardized absorber size that meets varying performance needs. Also, the dissimilar absorbers may be manufactured on a common assembly line with common parts, significantly reducing the costs of assembly and parts.

Interchangeable generally helical coils are therefore an advantage of the present invention. However, non-removable coils are within the scope of the invention. This and other modifications to the present invention would be obvious to one skilled in the art who is familiar with the present disclosure.

Further, the present invention is not limited to the precise form of apparatus disclosed. One skilled in the art may easily and readily adapt the teachings of the present invention to any device with two fluids in heat exchange. In particular, one skilled in the art may readily apply the spiral design and its accompanying benefits to the known art of heat exchangers. In a heat exchanger, a hot solution flows in heat exchange with a cold solution. Using the teachings of the present invention, one skilled in the art could easily develop a heat exchanger that pumps one solution in a generally helical path in heat exchange with the other solution.

Also, one skilled in the art could apply the teachings of the present invention to a cooling system generator design. A generator is merely an absorber operating in reverse. Heat is supplied to a generator to drive vapor from a solution. Heat is withdrawn from an absorber to dissolve vapor in a solution. Accordingly, by merely inverting the present invention and supplying a hot fluid in place of the coolant, it may be operated as a generator. Rather than dissolving refrigerant vapor in an initially weak solution, the device would then drive refrigerant vapor from an initially strong solution.

What is claimed is:

1. A fluid heat exchange apparatus comprising:

a first wall;

a second wall substantially parallel to the first wall, the first and second walls defining a space between them for carrying a solution, the second wall being thermally conductive to allow heat transfer through the wall;

a circumferentially grooved rod subdividing the space to define a tortuous fluid path for the flow of solution between the first and second walls.

2. The heat exchange apparatus of claim 1, wherein the first and second walls are substantially concentric cylinders defining an annular space between the cylinders.

3. The heat exchange apparatus of claim 2, wherein the circumferentially grooved rod is a helical coil rod that defines a generally helical passage bounded by the successive runs of the generally helical coil rod and the fist and second walls.

4. The heat exchange apparatus of claim 1, further including:

a third wall substantially parallel to the first and second wall and positioned so that the second wall is between the first wall and the third wall, the second and third walls defining a second space between them for carrying a heat transfer fluid, the second wall allowing heat transfer between the solution and the heat transfer fluid.

5. The heat exchange apparatus of claim 4, further including:

a rod subdividing the second space to define a tortuous fluid path for the flow of heat transfer fluid between the second and third walls.

6. A fluid heat exchange apparatus comprising:

a first cylinder;

a second cylinder substantially concentric to the first cylinder, the first and second cylinders defining an annular space between them for carrying a solution, the second cylinder being thermally conductive to allow heat transfer through the cylinder;

a circumferentially grooved helical coil rod in the annular space, the circumferentially grooved helical coil rod defining a generally helical passage for the flow of solution, the generally helical passage bounded by the successive runs of the circumferentially grooved helical coil red and the first and second cylinders.

7. The heat exchange apparatus of claim 6, further including:

a third cylinder substantially concentric to the first and second cylinders and positioned so that the second cylinder is between the first cylinder and the third cylinder, the second and third cylinders defining a second annular space between them for carrying a heat transfer fluid, the second cylinder allowing heat transfer between the solution and the heat transfer fluid.

8. The heat exchange apparatus of claim 7, further including:

a helical rod in the second annular space, the helical rod defining a second generally helical passage for the flow of heat transfer fluid, the second generally helical passage bounded by the successive runs of the helical rod and the first and second cylinders.

* * * * *